(12) United States Patent
Kashnikov et al.

(10) Patent No.: US 10,691,556 B2
(45) Date of Patent: Jun. 23, 2020

(54) RECOVERING A SPECIFIED SET OF DOCUMENTS FROM A DATABASE BACKUP

(71) Applicant: QUEST SOFTWARE INC., Aliso Viejo, CA (US)

(72) Inventors: Kirill V. Kashnikov, St. Petersburg (RU); Sergey R. Vartanov, St. Petersburg (RU); Sergey E. Zalyadeev, St. Petersburg (RU)

(73) Assignee: QUEST SOFTWARE INC., Aliso Viejo, CA (US)

( * ) Notice: Subject to any disclaimer, the term of this patent is extended or adjusted under 35 U.S.C. 154(b) by 571 days.

(21) Appl. No.: 15/008,081

(22) Filed: Jan. 27, 2016

(65) Prior Publication Data

US 2017/0212811 A1    Jul. 27, 2017

(51) Int. Cl.
*G06F 16/00* (2019.01)
*G06F 11/14* (2006.01)
*G06F 16/13* (2019.01)
*G06F 16/11* (2019.01)

(52) U.S. Cl.
CPC ...... *G06F 11/1469* (2013.01); *G06F 11/1451* (2013.01); *G06F 16/113* (2019.01); *G06F 16/122* (2019.01); *G06F 16/128* (2019.01); *G06F 16/13* (2019.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 7,197,520 | B1* | 3/2007 | Matthews | G06F 11/1458 |
| 7,752,176 | B1* | 7/2010 | Kushwah | G06F 17/30067 |
| | | | | 707/679 |
| 2005/0138087 | A1* | 6/2005 | Beck | G06F 11/1469 |
| 2012/0078855 | A1* | 3/2012 | Beatty | G06F 11/1451 |
| | | | | 707/676 |
| 2014/0372384 | A1* | 12/2014 | Long | G06F 17/30289 |
| | | | | 707/679 |
| 2015/0099491 | A1* | 4/2015 | Jeon | H04W 4/12 |
| | | | | 455/412.2 |
| 2016/0063007 | A1* | 3/2016 | Iwasaki | G06F 17/30079 |
| | | | | 707/645 |
| 2016/0210064 | A1* | 7/2016 | Dornemann | G06F 17/30575 |

* cited by examiner

*Primary Examiner* — Son T Hoang
(74) *Attorney, Agent, or Firm* — Maschoff Brennan

(57) ABSTRACT

Techniques and systems for restoring objects from a backup file without restoring a remainder of the backup file are described. For example, a plurality of object identifiers that identify a plurality of objects stored in the backup file may be determined. A selection of an object identifier of the plurality of object identifiers may be received. A set of objects to be restored from the backup file may be determined based on the object identifier. The set of objects may be granularly restored to a staging database directly from the backup file, without restoring a remainder of the backup file. The set of objects may be migrated from the staging database to a production database.

17 Claims, 6 Drawing Sheets

RECOVERING A SPECIFIED SET OF DOCUMENTS FROM A DATABASE BACKUP

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many companies (e.g., enterprises) use a database (e.g., a document repository or other type of database), such as Microsoft Sharepoint®, to store documents associated with the enterprise (e.g., generated by employees). Such document repositories provide various features, including enabling files to be shared among different groups, restricting access to confidential documents, and period backups of the contents of each database. Some documents (or particular versions of documents) may be inadvertently deleted (e.g., a user accidently deletes the documents) or become corrupted (e.g., due to disk failure etc.). In such situations, a user may request the company's Information Technology (IT) department to restore particular documents (or particular versions of documents) from a database backup. For example, a user may request a particular set of SharePoint® objects (e.g., documents, etc.) to be restored from a backup.

To restore even a relatively small number of documents, the entire database back up is restored and then the relatively few documents that were requested are retrieved from the restored database. However, restoring a database backup that includes a large number of documents may consume a significant amount of time and computing resources. For example, when using Microsoft® Content Migration, the entire contents of the database backup are restored to a staging database, typically resulting in a large number (e.g., thousands) of database objects being restored over a long period of time (e.g., many hours) and occupying a large number (e.g., gigabytes) of space on the staging database. Thus, thousands of database objects may be restored over several hours and occupy gigabytes of space on the staging database, even when less than five documents (e.g., occupying a few kilobytes) were specified in the backup request.

SUMMARY

This Summary provides a simplified form of concepts that are further described below in the Detailed Description. This Summary is not intended to identify key or essential features and should therefore not be used for determining or limiting the scope of the claimed subject matter.

Techniques and systems for restoring objects from a backup file without restoring a remainder of the backup file are described. For example, a plurality of object identifiers that identify a plurality of objects stored in the backup file may be determined. A selection of an object identifier of the plurality of object identifiers may be received. A set of objects to be restored from the backup file may be determined based on the object identifiers. The set of objects may be granularly restored to a staging database directly from the backup file, without restoring a remainder of the backup file. The set of objects may be migrated from the staging database to a production database.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
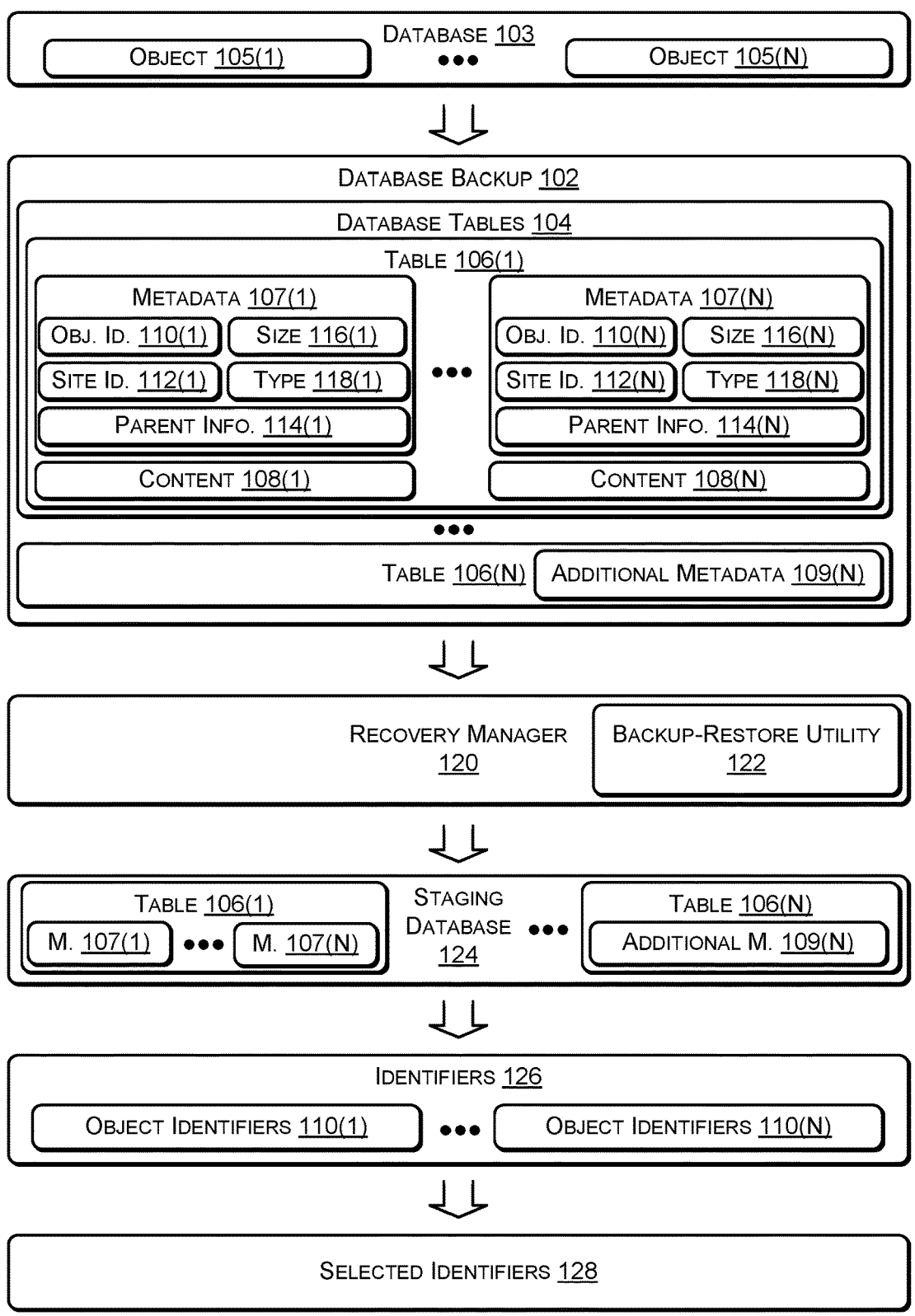
FIG. 1 is a block diagram illustrating an exemplary architecture to create a set of identifiers of objects stored in a database backup according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a selected set of documents to be quickly restored from a database backup. The database backup may include multiple objects, where an object is either a document or a container (e.g., a Sharepoint® document library, Sharepoint® list, or similar document container) that includes additional objects. Thus, objects may be nested to create a hierarchical structure. The database backup may include different types of documents, such as word processing documents (e.g., Microsoft® Word®, Lotus® Word Pro, or the like), spreadsheet documents (e.g., Microsoft® Excel®, Lotus® 123, or the like), presentation documents (e.g., Microsoft® PowerPoint®, Lotus® Freelance Graphics, or the like), electronic mail (email) documents (e.g., Microsoft® Outlook®, or the like), images (e.g., JPEG, TIFF, or the like) etc.

While some of the examples provided herein describe documents in a Microsoft® SharePoint® based database (e.g., a document repository or other type of database), the systems and techniques described herein may be used to restore other types of document repositories where there is a corresponding object Export/Import tool that can be used to resolve object dependencies (e.g., to determine child objects and linked objects). Thus, the systems and techniques described herein are not restricted to restoring SharePoint® objects (e.g., documents).

The database backup includes several different types of tables, with at least one table including (1) content of an object and (2) metadata (e.g., size, location, type of content, and the like) associated with the object and with one or more additional tables including additional metadata. To avoid performing a full restore of the entire contents of a database backup, the following process is followed. First, a list of object identifiers of objects included in the database backup may be generated by restoring tables from the database backup without restoring the content of the objects. For example, to identify which objects are included in the database backup, the database tables in the database backup may be restored (e.g., without restoring the content) using an object-level recovery application (e.g., Dell® LiteSpeed® for SQL server) to a staging database. The database tables that are restored may include object identifiers associated with objects stored in the database backup. A list of object identifiers of the objects stored in the database backup may be created. A user may select one or more object identifiers. The object identifiers may be passed to an export program (e.g., Microsoft® SharePoint® Content Migration Export) as parameters. A content migration test mode may be used to create a list of the object identifiers associated with the objects to be restored, including particular objects corresponding to the selected object identifiers, child objects of the particular objects, and linked objects (e.g., objects to which the particular objects have links). The tables (and metadata) included in the backup file are restored to a staging database without restoring the object content. The object content is stored in particular fields of a special table (e.g., DocStreams in SharePoint®). Thus, the tables and object metadata are restored without restoring the object content from the content fields. An object-level recovery program (e.g., Dell® LiteSpeed®) may restore the object content of the object identifiers that were selected. The object content may be restored directly from the database backup to the staging database. By restoring the tables included in the backup file and restoring particular object content stored in a special table (e.g., the DocStreams SQL table in SharePoint®), the backed-up objects associated with selected identifiers may be exported from the staging database and then imported to a destination (e.g., SharePoint®) database.

Thus, object content associated with selected identifiers may be restored directly from a database backup, within a few seconds, without restoring the entire database backup. A backup and recovery tool may be used to create a list (or other type of data structure) of object identifiers associated with objects stored in a backup of a database. A user may select for restoration one or more object identifiers from the list of object identifiers. The objects to be restored may be determined by determining particular objects associated with the selected object identifiers, child objects of the particular objects, and linked objects (e.g., the particular objects may include links to the linked objects). The backup and recovery tool may restore the content of the objects to be restored. The content and the metadata of the objects to be restored may be restored directly from the database backup to a staging database and then the objects to be restored may be exported as a package to a disk and then imported to a production database. In this way, the content and metadata of objects corresponding to the selected object identifiers, including child objects and linked objects, may be restored directly from the database backup without restoring the contents of the entire database backup, resulting in much faster restoration of the selected object identifiers (e.g., a few seconds instead of a few hours) and without the entire restored database occupying a large amount of space on the staging server.

FIG. 1 is a block diagram illustrating an exemplary architecture 100 to create a set of identifiers of objects stored in a database backup according to some embodiments. FIG. 1 includes a database backup 102. The database backup 102 may be a backup of a database 103 (e.g., a SharePoint® document repository or other database) that includes multiple objects 105(1) to 105(N) (N>0). The database backup 102 may include tables that include object metadata and object content of the objects 105(1) to 105(N) (e.g., SharePoint® objects, Lotus Notes® objects, or the like) as well as additional tables with additional metadata. The database backup 102 may include multiple tables 106, such as a table 106(1) to a table 106(N). In some cases, compression techniques (e.g., ZIP, TAR, or the like) may be used to reduce a size of the backups of the object metadata and object content.

The document content table 106(1) includes the document content and the metadata. Other tables have metadata only may include metadata and content associated with objects (e.g., documents) that are stored in the database backup 102. For example, the table 106(1) may include metadata 107(1) and content 108(1) associated with the object 105(1). The table 106(N) may include metadata 107(N) and content 108(N) associated with an object 105(N). The metadata 107(1) in the table 106(1) may include an object identifier 110(1), a site identifier 112(1), parent information 114(1), size data 116(1), and type 118(1). Of course, the metadata 107(1) may include other information associated with objects 105 in addition to the object identifiers 110, the site identifiers 112, the parent information 114, the size data 116, and the types 118. For example, the metadata 107(1) may include permissions identifying a privilege level required to access objects, publishing levels (e.g., checked out, draft, or published), or other object-related information. The object identifier 110(N) may be a document name, e.g., a name of the content 108(N), such as "Sales Presentation.ppt," "Monthly Forecast.xls," "Guidelines.doc," etc. The site identifier 112(N) may identify a location (e.g., site, path, etc.)

where the object 105(N) is located, e.g., server_A/backup_of_2015_03_12/user_1. The parent information 114(N) may include hierarchical relationship information between the object 105(N) and zero or more other object(s) in the database backup 102. For example, the parent information 114(N) may identify parent object(s) of the object 105(N) or the like. The parent information 114 may be used to create a tree structure identifying the hierarchical relationship between two or more objects. The size data 116(N) may include information associated with a size of the content 108(N). The type 118(N) may include information associated with a type of the content 108(N). For example, the content type 118(N) may identify whether the content 108 (N) is a container (e.g., a folder), a document, a spreadsheet, a presentation, a drawing, an illustration, a graphic, an email, an image, or another type of object.

A recovery manager 120 (e.g., Dell® Recovery Manager) may create a list (or other data structure) of the names (e.g., the object identifiers 110(1) to 110(N)) of objects whose content and metadata are stored in the database backup 102. For example, documents names and their corresponding locations may be displayed to enable a user to select which documents to restore. The recovery manager 120 may determine the object identifiers corresponding to the selected document names. The recovery manager 120 may use a backup-restore utility 122 (e.g., Dell® LiteSpeed for SQL Server) to granularly restore the tables 106 with the metadata 107 to a staging database 124, without restoring the corresponding content 108. The staging database 124 may comprise an intermediate storage area used for data processing during the extract, transform and load (ETL) process. The staging database 124 may be between one or more server(s) hosting the database backup 102 and a target database, such as a client document repository (or other type of database).

Based on the metadata 107, the recovery manager 120 may create a set (e.g., a list or other type of data structure) of identifiers 126, e.g., the object identifiers 110(1) to 110(N) corresponding to the object 105(1) and the object 105(N), respectively. A user may browse or search the set of identifiers 126 and select one or more identifiers from the set of identifiers 126 to create selected identifiers 128. One or more of the objects 105 corresponding to the selected identifiers 128 may be restored to the staging database 124, as described in more detail below.

Figure 2:
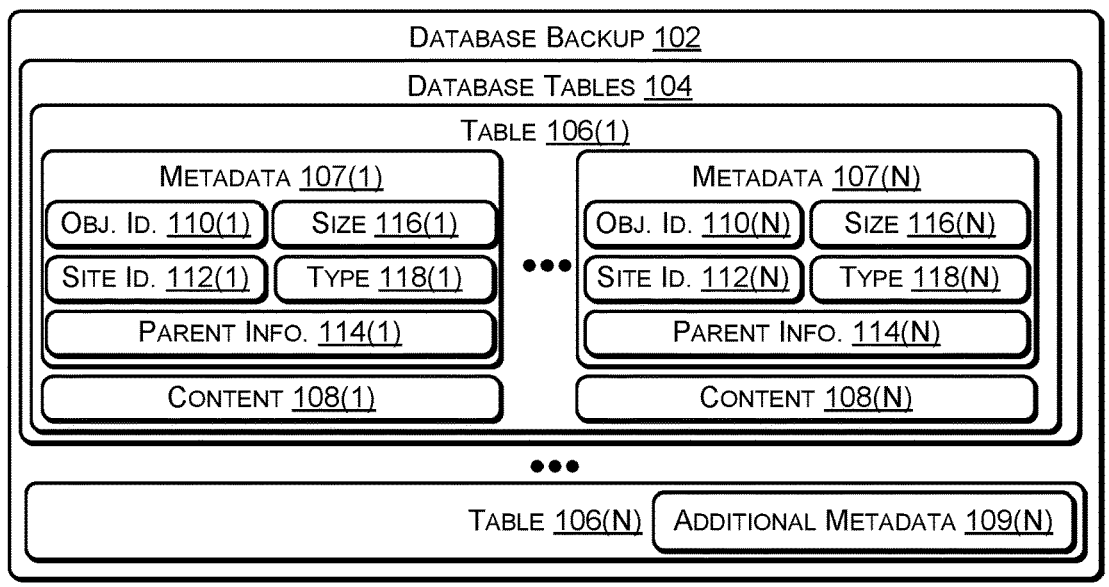
FIG. 2 is a block diagram illustrating an exemplary architecture to restore a set of objects from a database backup according to some embodiments.
Figure 2:
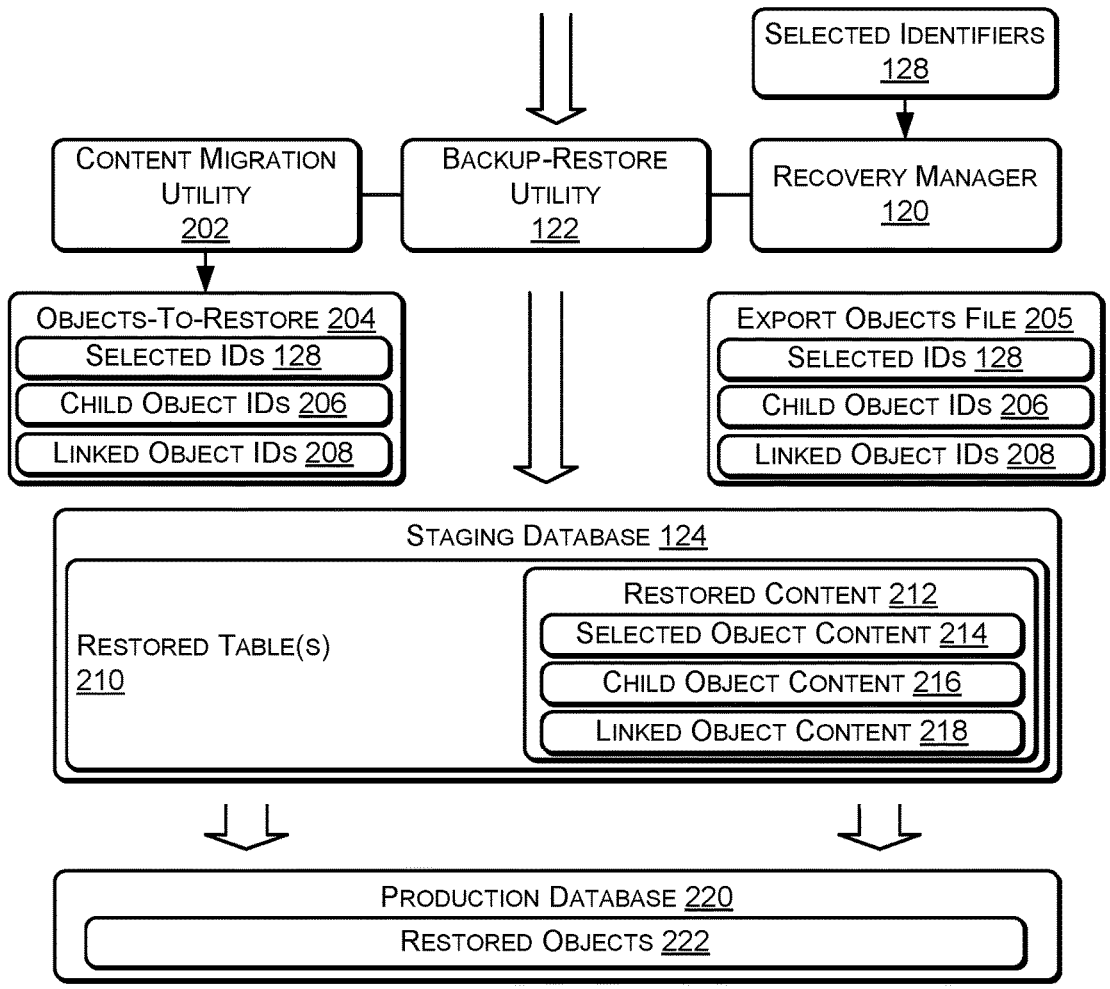

FIG. 2 is a block diagram illustrating an exemplary architecture 200 to restore a set of objects from a database backup according to some embodiments. The recovery manager 120 (e.g., Dell® Recovery Manager) may configure a content migration utility 202 (e.g., Microsoft® SharePoint® Content Migration API) using the selected identifiers 128 (e.g., selected from the set of identifiers 126) as input parameters. For example, a content migration application programming interface (API) of the content migration utility 202 may be configured (e.g., with TestRun and LogExportObjectsTable enabled) to determine objects-to-restore 204, including one or more of the objects that correspond to the selected identifiers 128. The content migration utility 202 may recursively resolve dependencies (e.g., child objects, linked objects, etc.) in the objects associated with the selected identifiers 128 to identify any additional objects for inclusion in the objects-to-restore 204. For example, an object may be (1) a container (e.g., a folder) that includes other objects or (2) a document (e.g., a word processing document, a presentation document, a spreadsheet document), an email, a graphical image, or another type of document that may be stored in a document repository or other type of database. To recursively resolve dependencies in the objects associated with the selected identifiers 128, the content migration utility 202 may identify child objects of the objects associated with the selected identifiers 128. For example, if one of the selected identifiers is associated with a parent object, such as a container, additional objects stored in the container may be child objects of the parent object. The content migration utility 202 may identify child object identifiers 206 associated with the objects (e.g., that are associated with the selected identifiers 128) and include the child object identifiers 206 in the objects-to-restore 204. The content migration utility 202 may identify links in the objects associated with the selected identifiers 128 and determine the linked objects referenced by the links. The content migration utility 202 may determine linked object identifiers 208 corresponding to the linked objects and include the linked object identifiers 208 in the objects-to-restore 204. Thus, the objects-to-restore 204 may include a list (or other data structure) of the selected identifiers 128 and object identifiers of objects that have a dependency (e.g., child objects or linked objects) to the objects associated with the selected identifiers 128. For example, the objects-to-restore 204 may include one or more of the selected identifiers 128, the child object identifiers 206, or the linked object identifiers 208.

Based on the objects-to-restore 204, the content migration utility 202 may use non-process SharePoint® export (or a similar utility) to create an export objects file 205 that includes descriptions of objects to be exported in extended markup language (XML) format. For example, a content migration application programming interface (API) of the content migration utility 202 may be configured (e.g., with TestRun and LogExportObjectsTable enabled). The content migration application API executed with TestRun enabled is a "non-process SharePoint export" because no content is exported (e.g., the export operation is "tested"). However, object dependencies are resolved and an export plan containing object identifiers is generated in an extended markup (XML) file. The descriptions of the objects to be exported may include the object identifiers 128, 206, 208 of the objects to be exported. The recovery manager 120 may retrieve the object identifiers 128, 206, 208 involved into the export operation from the export objects file 205 and restore object content (e.g., one or more of the content 108(1) to 108(N)) corresponding to portions of the tables 106 to the staging database 124 using the backup-restore utility 122. For example, the recovery manager 120 may (i) restore selected tables (e.g., based on the selected identifiers 128) from the tables 106 from the database backup 102 to the staging database to create restored tables 210 and (ii) restore selected content 108 (e.g., based on the selected identifiers 128) to create restored content 212 in the staging database. The restored content 212 may include selected object content 214 (e.g., corresponding to the selected identifiers 128), child object content 216 (e.g., corresponding to the child object identifiers 206), and linked object content 218 (e.g., corresponding to the linked object identifiers 208).

The content migration utility 202 may create a content migration file that includes object content (e.g., document content) in binary format, document description files in xml format, and export specific files from the staging database 124 to a production database 220 (e.g., a client document repository or other type of database) to provide restored objects 222 (e.g., including the restored tables 210 and the restored content 212) to a user that requested their restoration.

Thus, after a user has provided the selected identifiers 128, the objects-to-restore 204 may be determined recursively to identify child objects (e.g., child objects of the objects associated with the selected identifiers 128) and linked objects that are referenced by links in the objects associated with the selected identifiers 128. The tables associated with the objects-to-restore 204 may be read from the database backup 102 and stored on the staging database 124 to create the restored tables 210. The binary content of the objects identified by the objects-to-restore 204 may be read from the database backup 102 and stored on the staging database 124 to create the restored content 212. The restored tables 210 that include the restored content 212 may be exported from the staging database 124 as a package. The exported package including the restored content (e.g., documents) is created by the Content Migration API Export operation. The exported package is imported to a production database (e.g., SharePoint®) using an "Import" operation to restore the selected objects (including child objects and linked objects). In this way, a user may select one or more objects for restoration. The selected identifiers 128 may be determined. The restored content 212 may be restored directly and granularly from the database backup 102, without having to restore the entire database backup 102 (e.g., without restoring all of the objects backed up in the database backup 102) to the staging database 124. The restored content 212 can be restored from the database backup 102 within a few seconds instead of a few hours. In addition, the restored content 212 and the restored tables 210 may occupy an amount of space on the staging database 124 that is less than an amount of space that the database backup 102 would occupy after being restored on to the staging database 124.

Figure 3:
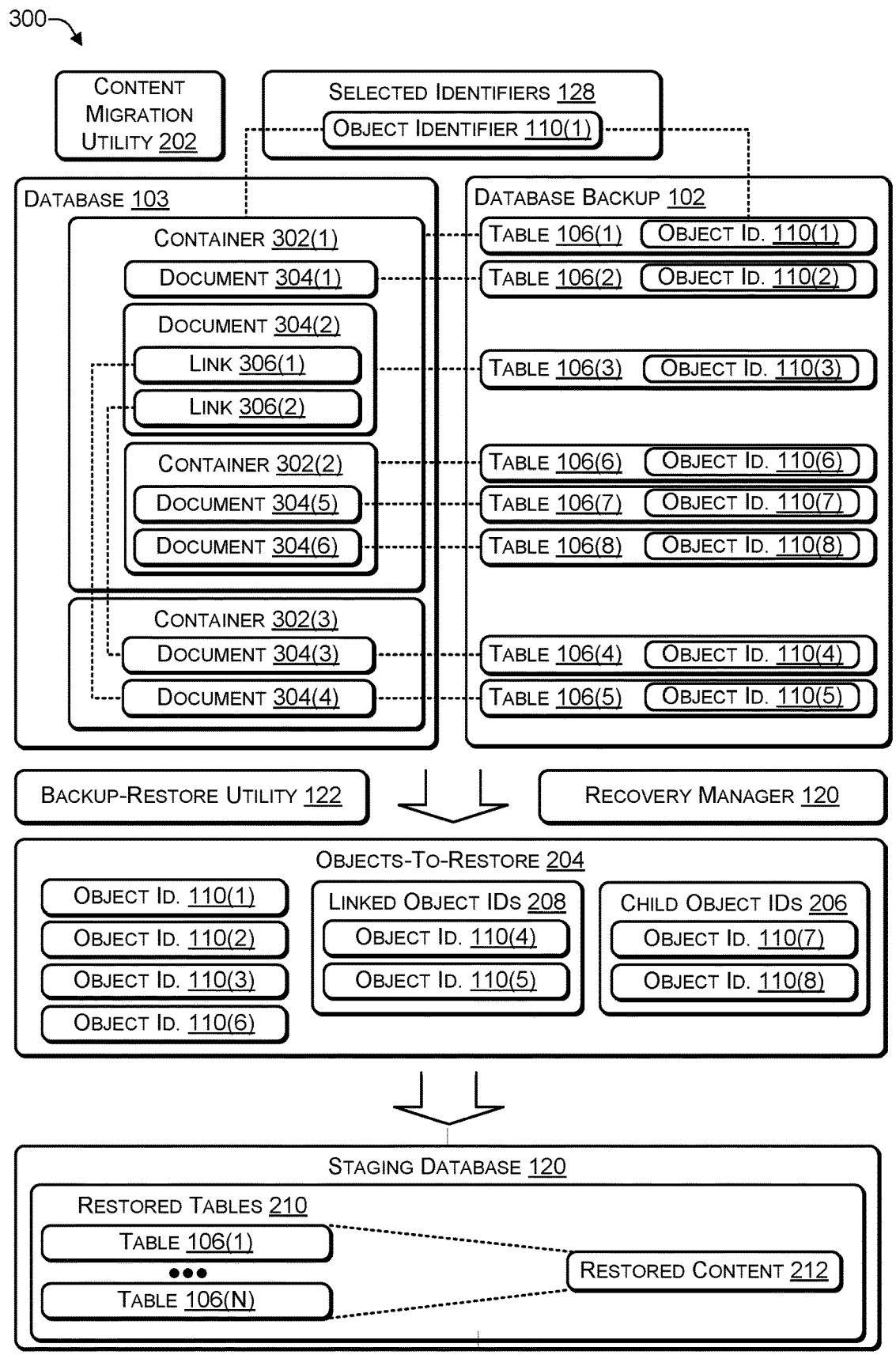
FIG. 3 is a block diagram illustrating an exemplary architecture to determine objects to restore according to some embodiments.

FIG. 3 is a block diagram illustrating an exemplary architecture 300 to determine objects to restore according to some embodiments. The recovery manager 120 (e.g., Dell® Recovery Manager) may provide the selected identifiers 128 as input parameters to the content migration utility 202 (e.g., Microsoft® SharePoint® Content Migration). For example, Microsoft® SharePoint® Content Migration API may be configured with TestRun and LogExportObjectsTable enabled to determine the objects-to-restore 204.

The content migration utility 202 may resolve dependencies (e.g., by identifying child objects, linked objects, etc.) in the objects associated with the selected identifiers 128 to identify any additional objects for inclusion in the objects-to-restore 204. For example, as illustrated in FIG. 3, the selected identifiers 128 may include the object identifier 110(1). The content migration utility 202 may determine that the object identifier 110(1) is an identifier associated with a container 302(1) (e.g., a folder, a directory, or another type of container) in the database 103.

The content migration utility 202 may determine that the container 302(1) includes three objects, e.g., a document 304(1), a document 304(2), and a container 302(2). The content migration utility 202 may determine that the document 304(2) includes two links, e.g., a link 306(1) to a document 304(3) and a link 306(2) to a document 304(4). The content migration utility 202 may determine that the documents 304(3) and 304(4) are stored in a container 302(3) that is different from the container 302(1). The content migration utility 202 may determine that the container 302(2) includes two objects, e.g., a document 304(5) and a document 304(6).

Thus, in this example, the content migration utility 202 may determine, based on the object identifier 110(1), that tables and content associated with eight objects are to be restored, e.g., tables and content associated with the container 302(1), the container 302(2), the document 304(1), the document 304(2), the document 304(3), the document 304 (4), the document 304(5) and the document 304(6). The tables and content of documents 304(5), 304(6) are identified as objects to be restored due to being child objects of the container 302(1). The documents 304(3), 304(4) are linked objects, e.g., objects referenced by links in one of the objects (e.g., the document 304(2)) in the container 302(1), and are therefore identified as objects to be restored.

The content migration utility 202 may determine the objects-to-restore 204 by determining an object identifier associated with each of the eight objects that are to be restored. For example, the container 302(1) may have an associated table 106(1) that includes the object identifier 110(1). The document 304(1) may have an associated table 106(2) (e.g., metadata) that includes an object identifier 110(2). The document 304(2) may have an associated table 106(3) that includes an object identifier 110(3). A linked object, e.g., the document 304(3), may have an associated table 106(4) that includes an object identifier 110(4). A linked object, e.g., the document 304(4), may have an associated table 106(5) that includes an object identifier 110(5). The container 302(2) may have an associated table 106(6) that includes an object identifier 110(6). A child object, e.g., document 304(5) may have an associated table 106(7) that includes an object identifier 110(7). A child object, e.g., document 304(6) may have an associated table 106(8) that includes an object identifier 110(8). The content migration utility 202 may determine that the tables and content corresponding to the object identifiers 110(1), 110(2), 110(3), 110(4), 110(5), 110(6), 110(7), and 110(8) are to be restored. Thus, the objects-to-restore 204 may include the object identifiers 110(1), 110(2), 110(3), and 110(4), the linked object identifiers 208 that include the object identifiers 110(4), 110(5), and the child object identifiers 206 that include the object identifiers 110(7) and 110(8).

The content migration utility 202 may restore the tables 106(1) to 106(N) from the database backup 102 to the staging database 124 to create the restored tables 210. The content of objects and the metadata associated with the objects may be stored in the table 106(1) (e.g., a DocStreams SQL table). The table 106(1) may include SQL rows corresponding to each object that is backed-up. Initially, the SQL rows may be restored without restoring the value of the content 108 field of the rows. Each row may be identified using a unique object identifier. After determining the objects-to-restore 204 (e.g., object identifiers of the objects-to-restore) the particular content values associated with the object identifiers in the objects-to-restore 204 may be restored using a tool, such as Dell® Litespeed®. The backup-restore utility 122 may process the objects-to-restore 204 to directly and granularly restore the content associated with the container 302(1), the container 302(2), the document 304(1), the document 304(2), the document 304(3), the document 304(4), the document 304(5), and the document 304(6) from the database backup 102 to the staging database 124, thereby creating the restored content 212. The content migration utility 202 may create a content migration package that includes object content (e.g., document content) in binary format, document description files in XML format. The content migration utility 202 may import the content migration package from the staging database 124 to the production database 220.

Thus, after a user has provided the selected identifiers 128, the objects-to-restore 204 may be determined, including child objects (e.g., documents 304(5), 304(6)) of the objects associated with the selected identifiers 128 and linked objects (e.g., the documents 304(3), 304(4)) that are referenced by links in the objects associated with the selected identifiers 128. The tables associated with the objects-to-restore 204 may be read from the database backup 102 and stored on the staging database 124 to create the restored tables 210. The binary content of the objects identified by the objects-to-restore 204 may be read from the database backup 102 and stored on the staging database 124 to create the restored content 212. In this way, a user may select a single identifier (e.g., object identifier 110(1)), and the dependencies associated with the container 302(1) may be identified to determine the objects-to-restore 204. The container 302(1) and the dependent objects may be restored directly and granularly from the database backup 102 to the staging database 124. The restored content 212 can be restored from the database backup 102 within a few seconds instead of a few hours.

Figure 4:
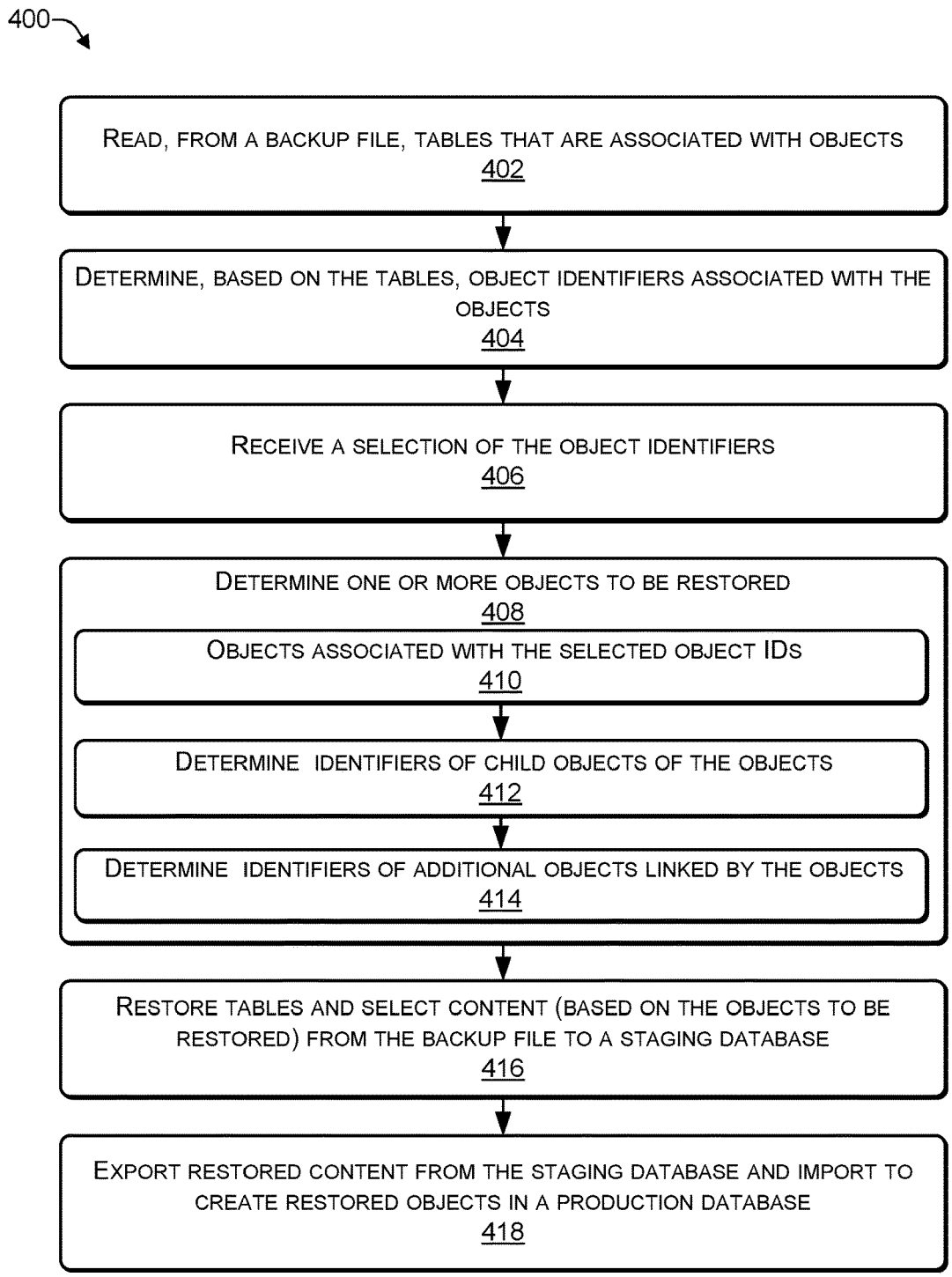
FIG. 4 is a flowchart of a process that includes creating a list of object identifiers associated with objects in a database backup according to some embodiments.
Figure 5:
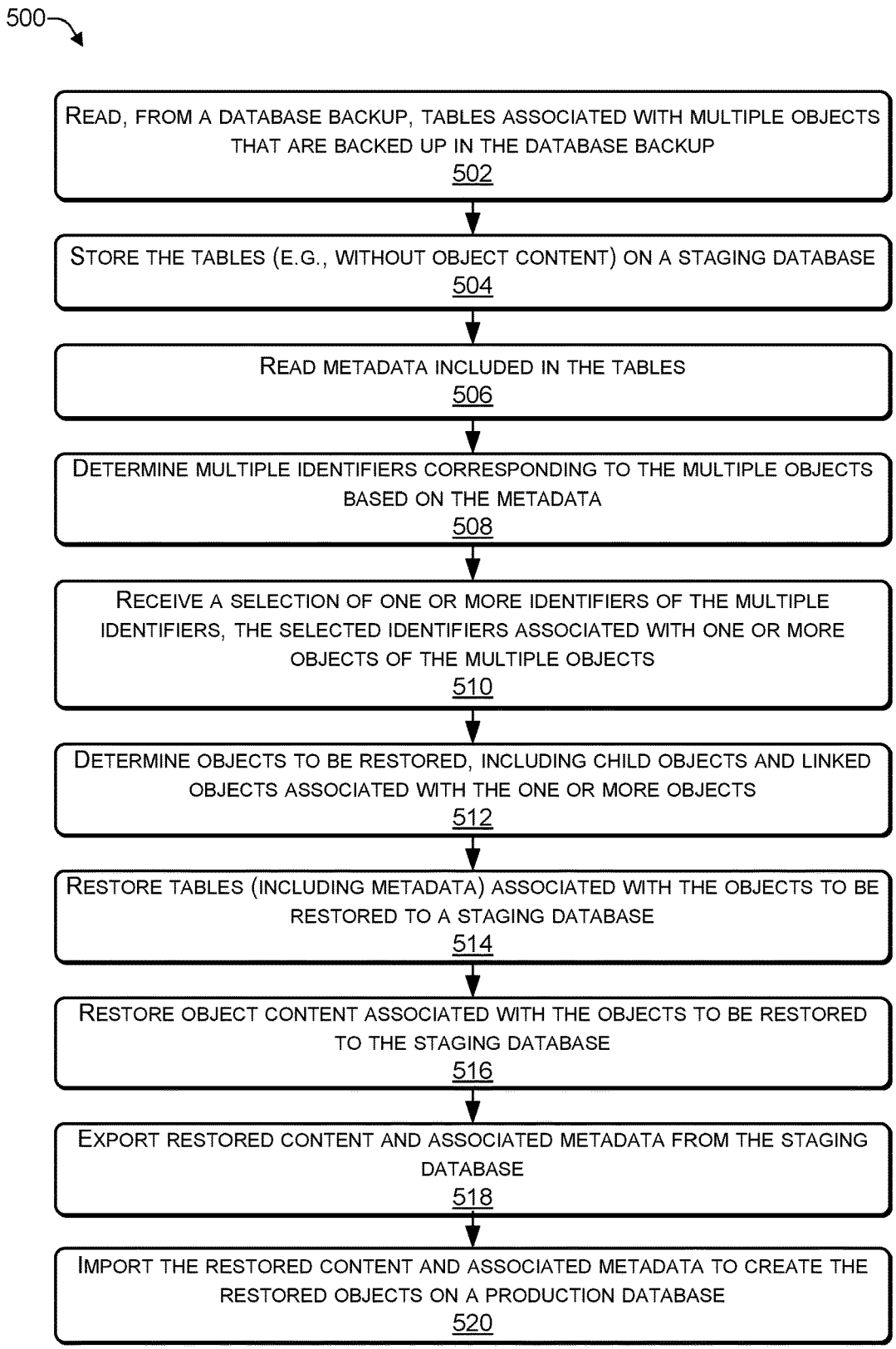
FIG. 5 is a flowchart of a process that includes restoring one or more objects according to some embodiments.

In the flow diagrams of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIG. 1, 2, or 3 as described above, although other models, frameworks, systems and environments may implement these processes.

FIG. 4 is a flowchart of a process 400 that includes creating a list of object identifiers associated with objects in a database backup according to some embodiments. The process 400 may be performed by one or more of the recovery manager 120, the backup-restore utility 122, or the content migration utility 202 of FIG. 2.

At 402, tables associated with objects are read from a backup file. The tables included in the backup file may be restored without restoring object content. Each table is associated with an object in a database that was backed up and stored in the backup file. Each table in the backup file may include metadata associated an object in the database and content associated with the object. At 404, object identifiers associated with the objects that were backed up may be determined, based on the tables. For example, in FIG. 1, the recovery manager 120 may use the backup-restore utility 122 to read the tables 106(1) to 106(N) associated with objects 105(1) to 105(N), from the database backup 102. The recovery manager 120 may extract the object identifiers 110(1) to 110(N) from the tables 106(1) to 106(N) to create the list of identifiers 126 that identify the objects 105(1) to 105(N) backed up and stored in the database backup 102.

At 406, a selection of one or more of the object identifiers may be received. At 408, one or more objects to be restored may be determined. At 410, objects associated with the selected object identifiers may be determined. At 412, identifiers of child objects associated with the objects may be determined. At 414, identifiers of additional objects linked by the objects may be determined. For example, in FIG. 3, the recovery manager 120 may receive the selected identifiers 128 and configure the content migration utility 202 with the selected identifiers 128 as input to identify the objects-to-restore 204. The content migration utility 202 may identify the object (e.g., container 302(1)) associated with the object identifier 110(1), the child objects (e.g., the documents 304(5) of the object, 304(6)), and linked objects (e.g., the documents 304(3), 304(4)) of the object. The content migration utility 202 may use the corresponding tables (e.g., tables 106(1) to 106(8)) to determine the object identifiers of the objects-to-restore 204.

At 416, select objects and select tables (e.g., metadata) associated with the objects to be restored may be restored to a staging database. For example, in FIG. 3, the recovery manager 120 may use the backup-restore utility 122 to granularly read select tables from the tables 106(1) to 106(8) (e.g., the tables corresponding to the objects-to-restore 204 from the database backup 102) and restore the tables to create the restored tables 210 in the staging database 124. The recovery manager 120 may use the backup-restore utility 122 to granularly read select content corresponding to the objects-to-restore 204 from the database backup 102 to create the restored content 212 in the staging database 124.

At 418, the restored object content may be migrated (e.g., exported) from the staging database to create restored objects in a production database. For example, in FIG. 2, the recovery manager 120 may use the content migration utility 202 to retrieve object information from the metadata associated with the objects to be restored and the restored content 212 from the staging database 124 and create the restored objects in the production database 220 (e.g., a client document repository, such as a SharePoint® database being used by a company to store employee created documents).

Thus, a user may select one or more object identifiers associated with particular objects in a backup file. The user may desire to have the particular objects corresponding to the selected object identifiers restored from the backup file. Select tables corresponding to the selected object identifiers may be identified and dependencies associated with each of the particular objects may be determined. For example, child objects associated with the particular objects may be identified for restoration along with the particular objects. Links in the particular objects may be determined and additional objects referenced by the links may be identified for restoration along with the particular objects. The tables associated with the objects to be restored may be read from the backup file and stored on a staging database. The content of the objects to be restored may be read from the backup file and stored on the staging database. The restored content and associated metadata may be migrated from the staging database to a production database, thereby restoring the particular objects, along with any dependent (e.g., child objects and linked objects) objects, for the user to access. In this way, a user may select object identifiers of objects for restoration and the tables and content associated with the objects, along with dependent objects, may be restored directly and granularly from the backup file, without having to restore all the files on the backup file to the staging database. The objects can be restored within a few seconds instead of a few hours because the entire backup file does not have to be restored. In addition, the restored tables and restored content of the objects selected to be restored may occupy much less space on the staging database as compared to restoring the entire backup file.

FIG. 5 is a flowchart of a process 500 that includes restoring one or more objects according to some embodiments. The process 500 may be performed by one or more of the recovery manager 120, the backup-restore utility 122, or the content migration utility 202 of FIG. 2.

At 502, tables may be read from a database backup. The tables may be associated with multiple objects backed up in the database backup. At 504, the tables (including metadata but excluding content) may be stored on (e.g., written to) a staging database. At 506, metadata included in the tables may be read. For example, in FIG. 1, the recovery manager 120 may use the backup-restore utility 122 to read the tables 106(1) to 106(N) associated with the objects 105(1) to 105(N), from the database backup 102. The recovery manager 120 may extract the object identifiers 110(1) to 110(N) from the metadata 107(1) to 107(N) to create the list of identifiers 126 that identify the objects 105(1) to 105(N) that were backed up and stored in the database backup 102.

At 510, a selection of one or more of the object identifiers associated with one or more of the multiple objects may be received. At 512, objects to be restored may be determined, including child objects associated with the objects and linked objects associated with the objects. For example, in FIG. 3, the recovery manager 120 may receive the selected identifiers 128 and configure the content migration utility 202 with the selected identifiers 128 as input to identify the objects-to-restore 204. The content migration utility 202 may identify the object (e.g., container 302(1) that includes the documents 304(1) and 304(2) and the container 302(2)) associated with the object identifier 110(1), the child objects (e.g., the documents 304(5) 304(6)) associated with the object, and the linked objects (e.g., the documents 304(3), 304(4)) associated with the object. The content migration utility 202 may use the corresponding tables (e.g., tables 106(1) to 106(8)) to determine the object identifiers (e.g., object identifiers 110(1) to 110(8)) of the objects-to-restore 204.

At 514, tables (including metadata) associated with the objects to be restored may be restored to a staging database. At 516, content of the objects to be restored may be restored to the staging database. For example, in FIG. 3, the recovery manager 120 may use the backup-restore utility 122 to granularly read the tables 106(1) to 106(8) corresponding to the objects-to-restore 204 from the database backup 102 and restore the restored tables 210 to the staging database 124. The recovery manager 120 may use the backup-restore utility 122 to granularly read the content of objects corresponding to the objects-to-restore 204 from the database backup 102 and restore the content (e.g., the restored content 212) to the staging database 124.

At 518, the restored tables (including the restored metadata) and the restored content may be exported from the staging database. At 518, the restored tables (including metadata) and the restored content may be imported to create restored objects (corresponding to the selected identifiers) on a production database. For example, in FIG. 2, the recovery manager 120 may use the content migration utility 202 to export the restored content 212 and associated metadata from the staging database 124 to create an export package and import the package to the production database 220 (e.g., a client database, such as a SharePoint® document repository being used by a company to store employee created documents) to create the restored objects.

Thus, a user may select one or more object identifiers associated with particular objects in a backup file. The user may desire to have the particular objects corresponding to the selected object identifiers restored from the backup file. The particular objects corresponding to the selected object identifiers may be identified and dependencies associated with each of the particular objects may be determined. For example, child objects associated with the particular objects may be identified for restoration along with the particular objects. Links in the particular objects may be determined and additional objects referenced by the links may be identified for restoration along with the particular objects. The tables (e.g., including metadata) associated with the objects to be restored may be read from the backup file and stored on a staging database. The content associated with objects to be restored may be read from the backup file and stored on the staging database. The restored tables and the restored content may be migrated from the staging database to a production database, thereby restoring the particular objects, along with any dependent objects, for the user to access. In this way, a user may select object identifiers of objects for restoration and the objects, along with dependent objects, may be restored directly and granularly from the backup file, without having to restore all of the backup file to the staging database. The objects can be restored from the backup file within a few seconds instead of a few hours because the entire backup file does not have to be restored. In addition, the restored tables, restored metadata, and restored content may occupy much less space on the staging database as compared to restoring the contents of the entire backup file.

Figure 6:
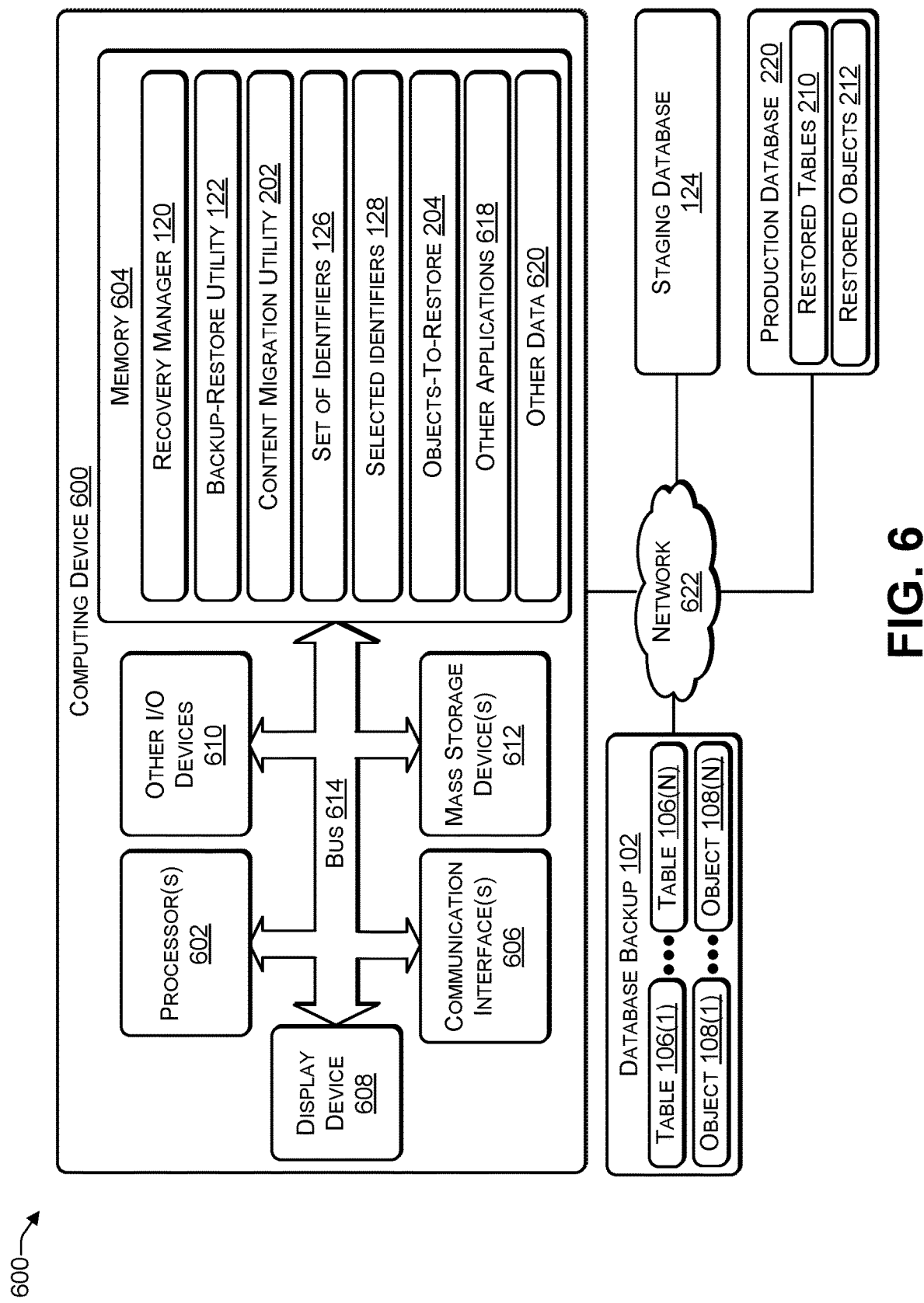
FIG. 6 illustrates an example configuration of a computing device that can be used to implement the systems and techniques described herein.

FIG. 6 illustrates an example configuration of a computing device 600 and environment that can be used to implement the modules and functions described herein. For example, the computing device 600 may be a server that hosts the database backup 102, the staging database 124, or both. The computing device 600 may include one or more processors 602, a memory 604, communication interfaces 606, a display device 608, other input/output (I/O) devices 610, and one or more mass storage devices 612, configured to communicate with each other, such as via a system bus 614 or other suitable connection.

The processors 602 may include a single processing unit or a number of processing units, all of which may include single or multiple computing units or multiple cores. The processors 602 can be implemented as one or more microprocessors, microcomputers, microcontrollers, digital signal processors, central processing units, state machines, logic circuitries, and/or any devices that manipulate signals based on operational instructions. Among other capabilities, the processors 602 can be configured to fetch and execute computer-readable instructions stored in the memory 604, mass storage devices 612, or other computer-readable media.

Memory 604 and mass storage devices 612 are examples of computer storage media for storing instructions which are executed by the processors 602 to perform the various functions described above. For example, memory 604 may generally include both volatile memory and non-volatile memory (e.g., RAM, ROM, or the like). Further, mass storage devices 612 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a non-transitory media capable of storing computer-readable, processor-executable program instructions as computer program code that can be executed by the processor 602 as a particular machine configured for carrying out the operations and functions described in the implementations herein. The memory of the computing device 600 may be used to store the database backup 102, the staging database 124, or both.

The computer storage media, such as memory 604 and mass storage devices 612, may be used to store software applications and data. For example, the computer storage media may include software applications, such as, for example, the recovery manager 120, the backup-restore utility 122, the content migration utility 202, and other applications 618. The computer storage media may include data, such as, for example, the set of identifiers 126, the selected identifiers 128, the objects-to-restore 204, and other data 620.

The computing device 600 may also include one or more communication interfaces 606 for exchanging data via a network 622. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 606 can also provide communication with external storage (not shown), such as in a storage array, network attached storage, storage area network, or the like.

A display device 608, such as a monitor, may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

The recovery manager 120 may receive the selected identifiers 128 and use the backup-restore utility 122 and the content migration utility 202 to determine the objects-to-restore 204. The recovery manager 120 may use the backup-restore utility 122 and the content migration utility 202 to restore the objects-to-restore 204 from the database backup 102 to create the restored tables 210 and the restored content 212 without restoring a remaining tables and remaining content of the database backup 102. In this way, the restored tables 210 and the restored content 212 may be restored in a few seconds, thereby avoiding spending a few hours to restore the entire contents of the database backup 102 and avoiding having the entire contents of the database backup 102 occupy a portion of the staging database 124.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry), or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:

selecting a backup file that includes multiple tables and object metadata corresponding to multiple backed-up objects, wherein each table of the multiple tables corresponds to a different object of the multiple backed-up objects;

determining multiple object identifiers stored in the multiple tables, wherein each object identifier of the multiple object identifiers is stored in each table of the multiple tables and identifies a corresponding object of the multiple backed-up objects;

receiving a selection of one or more object identifiers of the multiple object identifiers;

determining one or more objects to be restored based on the one or more object identifiers;

responsive to receiving a request to restore object content of the selected one or more object identifiers, without restoring the object content, restoring, to a staging database, one or more tables of the multiple tables and object metadata, different than the selected one or more object identifiers, associated with the selected one or more objects, wherein the one or more tables and the object metadata are restored based on the selected one or more objects identifiers;

importing, to a production database different from the staging database, the restored one or more tables and the restored object metadata associated; and restoring the object content to the production database based on the imported one or more tables and the imported object metadata.

2. The computer-implemented method of claim 1, further comprising:

exporting, from the staging database, the restored one or more tables and the restored object metadata associated with the selected one or more objects identifiers.

3. The computer-implemented method of claim 1, wherein particular object metadata associated with a particular object of the multiple backed-up objects includes at least one of:

a site identifier identifying a location from which the particular object was backed-up;

a size indicator providing size information associated with the particular object;

parent information identifying zero or more relationships between the particular object and other objects of the multiple backed-up objects; and type information identifying a type of the particular object.

4. The computer-implemented method of claim 1, wherein the determining the one or more objects to be restored based on the selected one or more object identifiers comprises:

determining a set of objects stored in the backup file being associated with the selected one or more object identifiers.

5. The computer-implemented method of claim 4, further comprising:

determining one or more child objects of at least one object of the set of objects.

6. The computer-implemented method of claim 4, further comprising:

determining a linked object that is referenced by a link in at least one object of the set of objects.

7. One or more non-transitory computer-readable media, comprising instructions that are executable by one or more processors to perform operations comprising:

selecting a backup file that includes multiple tables corresponding to multiple backed-up objects, wherein each table of the multiple tables corresponds to a different object of the multiple backed-up objects;

determining multiple object identifiers stored in the multiple tables, wherein each object identifier of the multiple object identifiers is stored in each table of the multiple tables and identifies a corresponding object of the multiple backed-up objects;

receiving a selection of one or more object identifiers of the multiple object identifiers;

determining one or more objects to be restored based on the one or more object identifiers; and responsive to receiving a request to restore object content of the selected one or more object identifiers, without restoring the object content, restoring, to a staging database, one or more tables of the multiple tables and object metadata, different than the selected one or more object identifiers, associated with the selected one or more objects, wherein the one or more tables and the object metadata are restored based on the selected one or more objects identifiers;

importing, to a production database different from the staging database, the restored one or more tables and the restored object metadata associated; and restoring the object content to the production database based on the imported one or more tables and the imported object metadata.

8. The one or more non-transitory computer-readable media of claim 7, the operations further comprising:

exporting, from the staging database, the restored one or more tables and the restored object metadata associated with the selected one or more objects identifiers.

9. The one or more non-transitory computer-readable media of claim 7, wherein particular object metadata associated with a particular object of the multiple backed-up objects includes at least one of:

a site identifier identifying a location from which the particular object was backed-up;

a size indicator providing size information associated with the particular object;

parent information identifying zero or more relationships between the particular object and other objects of the multiple backed-up objects; and type information identifying a type of the particular object.

10. The one or more non-transitory computer-readable media of claim 7, wherein the backup file comprises a backup of a shared document repository associated with an enterprise.

11. The one or more non-transitory computer-readable media of claim 7, wherein the backup file includes at least one of a word processing document, a presentation document, a spreadsheet document, a graphical image, or an electronic mail message.

12. A computing device, comprising:

one or more processors; and one or more non-transitory computer-readable media storing instructions that are executable by the one or more processors to perform operations comprising:

selecting a backup file that includes multiple tables corresponding to multiple backed-up objects, wherein each table of the multiple tables corresponds to a different object of the multiple backed-up objects;

determining multiple object identifiers stored in the multiple tables, wherein each object identifier of the multiple object identifiers is stored in each table of the multiple tables and identifies a corresponding object of the multiple backed-up objects;

receiving a selection of one or more object identifiers of the multiple object identifiers;

determining one or more objects to be restored based on the one or more object identifiers; and responsive to receiving a request to restore object content of the selected one or more object identifiers, without restoring the object content, restoring, to a staging database, one or more tables of the multiple tables and object metadata, different than the selected one or more object identifiers, associated with the selected one or more objects, wherein the one or more tables and the object metadata are restored based on the selected one or more objects identifiers;

importing, to a production database different from the staging database, the restored one or more tables and the restored object metadata associated; and restoring the object content to the production database based on the imported one or more tables and the imported object metadata.

13. The computing device of claim 12, the operations further comprising:
   exporting, from the staging database, the restored one or more tables and the restored object metadata associated with the selected one or more objects identifiers.

14. The computing device of claim 12, wherein particular object metadata associated with a particular object of the multiple backed-up objects includes at least one of:
   a site identifier identifying a location from which the particular object was backed-up;
   a size indicator providing size information associated with the particular object;
   parent information identifying zero or more relationships between the particular object and other objects of the multiple backed-up objects; and
   type information identifying a type of the particular object.

15. The computing device of claim 12, wherein the backup file comprises a backup of a shared document repository associated with an enterprise.

16. The computing device of claim 12, wherein the multiple backed-up objects include at least one of a word processing document, a presentation document, a spreadsheet document, a graphical image, or an electronic mail message.

17. The computing device of claim 12, wherein the determining the one or more objects to be restored based on the selected one or more object identifiers comprises:
   determining a set of objects stored in the backup file being associated with the selected one or more object identifiers.

* * * * *